Patented Aug. 24, 1954

2,687,365

UNITED STATES PATENT OFFICE 2,687,365

WARFARIN RODENTICIDE BAIT COMPOSITION AND PROCESS OF MAKING SAME

Karl Paul Link, Middleton, Wis., assignor to The d-Con Company, Inc., Chicago, Ill., a corporation of Illinois No Drawing. Application July 18, 1951, Serial No. 237,480

5 Claims. (Cl. 167—46)

The present invention relates to improved rodenticide compositions and in particular rodenticide compositions of special value for destroying mice and rats. The compositions comprise grain and in particular cracked corn in combination with a certain hydroxycoumarin derivative.

The rodent problem has been recognized as serious for many years. Mice and rats, for example, are known to consume and spoil large amounts of grain and other foods, spread filth and disease, kill chickens and the like, and even cause fires. The U. S. Government estimates that the rodents' annual board bill runs into the hundreds of millions of dollars and that each rodent destroys many times what they eat. When one considers that this is only a part of the overall rodent bill paid by the public along with the estimate that there are many millions of mice and rats in the United States, the magnitude of the problem in this country alone is readily apparent.

It has long been the established practice and generally accepted principle in the rodenticide field to employ very toxic, rapidly acting stomach poisons of the "single dose" type such as strychnine or the more recently proposed Antu or sodium fluoroacetate known as "1080," the latter being restricted to licensed pest control operators. The use of toxic substances of this type pose serious problems in use due to their equally toxic effect on humans and domestic animals. Also, investigations in the rodenticide field have shown that the rapidly acting poisons are not generally acceptable to the majority of the rodent colony, particularly after the toxic manifestations are apparent in the relatively few rodents (official colony food tasters) who initially test the new baits. This is known in the art as the development of "bait shyness."

The present invention involves a new concept in the rodenticide field and specifically multiple dose baits. It is based in part upon the discovery that warfarin, known chemically as 3-(α-acetonylbenzyl)-4-hydroxycoumarin, when taken by rodents in food in relatively small dosages possesses unique properties. Investigations, for example, have shown that, in addition to anticoagulant properties, the bait compositions of the present invention are characterized by capillary toxicity as evidenced by increased capillary fragility which develops rapidly.

Investigations have also shown that the 4-hydroxycoumarin compound used in the compositions of the present invention is 20–50 times more potent in the rodent than Dicumarol, known chemically as 3,3'-methylenebis(4-hydroxycoumarin), and that time of kill may be reduced materially by its use. It has been determined in this connection, for example, that average albino laboratory rats fed 2 mg. of Dicumarol per day (or a total of approximately 120 mg.) along with a normal dietary intake of the antihemorrhagic vitamin, vitamin K, as supplied by alfalfa meal, will survive about 60 days, and that the same strain of albino rat fed under identical conditions with the exception of the substitution of a daily intake of 0.33 mg. for five consecutive days (or a total of approximately 1.65 mg.) of warfarin for the 2 mg. of Dicumarol, will die in about 5–10 days. The reason for this is that the anticoagulant action of the 4-hydroxycoumarin compound of the present invention rapidly "outruns" the normal daily capacity of the vitamin K prothrombin mechanism to maintain the normal coagability of the blood, and that with natural food containing vitamin K, it is impossible for the rodent to eat enough to combat the effects of the drug. While the various physiological factors and blood chemistry involved present an extremely complex picture, the characteristics referred to above are important as they aid in making possible effective kills within a relatively few days.

The compositions of the present invention, while adaptable for eliminating rats, are, as indicated above, particularly efficient baits for destroying mice. They comprise cereal grain, seeds and the like coated and impregnated with warfarin. The preferred compositions contain corn of the coarsely cracked type such as used in chicken feed. It is obtained by cracking viable yellow mature corn of the standard #2 grade or a good #3 grade of commerce. It should be sound and contain a minimum of damaged or pregerminated kernels and should be of the type used, for example, for making breakfast foods for human consumption. Many tests have demonstrated the above factors, i. e., the use of viable seed type corn as distinguished from non-viable corn, yellow corn as distinguished from white corn, mature corn as distinguished from immature corn and good grade corn as distinguished from poor grade corn to be essential in the preparation of the most highly acceptable rodent baits. This is important for as other non-poisonous foods are generally available to the rodent, a poison bait which is not readily acceptable is for practical purposes of little real value.

During the corn cracking operation which is carried out in accordance with standard practices in the art, the hull or outer skin, a hemicellulose-carbohydrate material resistant to penetration, is broken or cut away. This exposes the following parts of the corn kernel:

(1) Relatively soft starch appearing primarily at the upper part of the kernel and extending downward to partly surround the germ.

(2) Relatively hard starch-gluten mixture appearing primarily at the sides and back of the kernel bulging in towards the center.

(3) The germ positioned in the center of the kernel which in addition to starch consists essentially of protein and fat or fatty oils. It is this part of the kernel which is particularly subject to penetration by or impregnation with the hydroxycoumarin compound and this is especially true when employing ethanol solutions. Also, as pointed out below, it is the germ which is the "piece de resistance" particularly enticing to the rodent.

It has been demonstrated by many tests that mice and rats preferably eat only the germ of whole kernel corn and that most of the kernel remains uneaten. It is for this reason that the use of baits containing whole kernel corn coated with poison are relatively uneconomical. Their use results not only in waste of food, but also a substantial waste of the relatively expensive poison which remains on the uneaten portions of the kernel. This disadvantage is not encountered with the cracked corn of the present invention and tests have demonstrated that the rodents consume substantially all of the cracked corn along with the germ. As a result there is little if any waste of either food or poison. In addition, as compared to mere poison coatings, more effective kills have been obtained when at least part of the poison is impregnated or absorbed in the food and particularly the germ. This is another advantage in the use of cracked corn over whole kernel corn for with the latter the hemicellulose hull is resistant to penetration and substantially no, or at best, little absorption of the poison takes place.

Viable yellow mature corn on the cob at the time of shelling generally contains 15% moisture. Before impregnation with warfarin as described below, it should be dried and then cracked or cracked and then dried so that the cracked corn (which is cracked in such a way that most particles contain some portion of the germ) does not contain more than approximately 10% moisture and preferably about 8% moisture. The relatively low moisture content of the cracked corn is important as it assists in obtaining optimum impregnation with the hydroxycoumarin compound. Maintaining the moisture content around 8% has also been found to provide for improved stability of the final product. The drying temperatures employed should be such as to kill insect eggs and larva, e. g., 110–115° F. for four days or 145° F. for two minutes, but should also be controlled so as not to alter significantly the viability of the corn. This is important as insect infested corn or corn which has lost its viability during drying due to overheating or loss of too much moisture has been found not to be readily acceptable to the rodent.

The warfarin or 4-hydroxycoumarin compound is applied to the dried cracked corn or other grain in solution form. In one of the preferred procedures the warfarin is dissolved in alcohol (ethanol) and the resulting alcohol solution sprayed on the dried cracked corn in the form of a very fine mist while effectively agitated as, for example, in a closed tumbler or mixer. The warfarin treated corn is then fine-sprayed with a relatively non-volatile hydrocarbon such as mineral oil and finally fine-sprayed with aqueous corn syrup. The treated corn is then dried at about 50–60° C. to remove excess moisture present along with the alcohol to give a final product having about 8% moisture. The mineral oil or the like and the corn syrup employed should be of good quality of the edible grade. Small amounts of other materials such as a polyhydric alcohol-fatty acid conditioner or softening agent e. g., glyceryl oleo stearate, may also be added to the spraying solutions if desired. Rapid drying of the corn as, for example, with a warm air blast after the application of the corn syrup has been found preferred for solidifying the syrup. High drying temperatures which destroy the viability of the corn or cause the solidified syrup to melt and become "sticky" should be avoided.

The cracked corn product resulting from the above treatment is covered with a coating of the hydrocarbon oil and also with an external coating of solidified corn syrup. The hydrocarbon coating which is in the nature of a stable oil shield has proven in practice along with the syrup coating to be protective. The coated dried corn, for example, is relatively resistant to mold and rancidity and has a reasonable shelf life. In these characteristics it differs materially from corn meal made from whole corn which is readily subject to mold and has a tendency to turn rancid in a short time when exposed to air. Both of these factors are important in this art for baits which are moldy or rancid are not readily acceptable to either mice or rats.

In addition to the coatings mentioned above, the low moisture cracked corn product of the present invention has also been found to absorb or be impregnated by the hydroxycoumarin compound solution. The greatest absorption or impregnation takes place in the exposed germ where in effect the protein and especially the fatty oil (in which the hydroxycoumarin compound is also soluble) "pulls in" the solution of the hydroxycoumarin compound. The resulting stable bait, while primarily designed for inside use may be used out of doors in suitable containers if desired. Many tests have shown it to be highly acceptable to both mice and rats.

In place of the ethanol solution described above the warfarin may also be applied to the cracked corn or grain as a water soluble salt in aqueous solution. Alkali metal salts such as the sodium salt are preferred. The salts may be prepared by reacting warfarin with dilute aqueous alkali solutions. The sodium salt is preferably made by reacting one mole of pure warfarin with slightly less than one mole of sodium hydroxide in aqueous solution, followed by removal of excess warfarin by filtration. The sodium salt which should contain no free alkali, may be obtained in solid form by removal of the water. With aqueous solutions the salt of the hydroxycoumarin compound is absorbed in the germ of cracked corn although a substantial amount is taken up in the exposed starchy parts of the kernel surrounding the germ. After application of the warfarin salt, the corn is coated with hydrocarbon oil and corn syrup and dried as explained above.

The warfarin or hydroxycoumarin compound should make up at least about 0.025% by weight on the dry substance basis of the total bait. Under some conditions as for example where there is a rich source of vitamin K available, it is advisable to raise the concentration of the hydroxycoumarin compound up to 0.035 or 0.05% (dry substance basis). The following examples will serve to illustrate the invention.

*Example I*

| | Pounds |
|---|---|
| Coarse cracked corn (dry substance basis) | 96.775 |
| Warfarin | 0.025 |
| Mineral oil | 1.000 |
| Corn syrup solids | 2.200 |
| | 100.000 |

Standard #2 yellow corn of commerce is first cracked in accordance with procedures known in the art and dried to a moisture content of about 8%. The warfarin is then dissolved in about 600 ml. of alcohol and the resulting solution sprayed on the dried cracked corn while agitated in a mixer. The agitated corn is next sprayed with the mineral oil. The corn is then sprayed with an aqueous solution of corn syrup containing about 2.2 lbs of corn syrup solids in sufficient water to provide an overall solution containing about 55–60% solids. The treated corn is then dried in a warm (50° C.) blast of air until the syrup solidifies as a thin, hard, glassy type coating. The final product should not contain more than about 10% moisture and preferably should be of the moisture content originally present in the corn, i. e., about 8%.

*Example II*

| | Pounds |
|---|---|
| Coarse cracked corn | 96.765 |
| Sodium salt of warfarin (calculated to warfarin basis) | 0.035 |
| Mineral oil | 1.000 |
| Corn syrup solids | 2.200 |
| | 100.000 |

This example follows the procedure of the previous example except that 0.035 lb. of warfarin is converted into its sodium salt as described above, and the resulting salt, dissolved in about 600 ml. of water, is sprayed on the corn. While it is possible for certain limited uses to employ the corn after drying in this example and Example I without further treatment, the application of the mineral oil coating and also preferably the corn syrup coating as described in Example I has proven in practice to yield much the preferred rodent bait.

Other cereal grains and the like such, for example, as wheat, cracked or rolled oats, etc. may be treated as described above. The preferred compositions, however, contain a substantial amount of viable cracked yellow corn with exposed germ treated as described in detail above.

The compositions of the present invention have a substantial biological stability, i. e. rate of deterioration is very slow, and have proven in practice easy to handle. The hydroxycoumarin compound unlike certain poisons such as the phosphorus compounds, is also chemically stable. The action of the bait, on the one hand, is sufficiently rapid to provide for effective kills and, on the other hand, sufficiently slow so that the "official tasters" do not have a chance to warn the rodent colony of impending danger. The rodents also do not know what is taking place, i. e., they are subject to no pain, and in many instances have been found dead or dying at the feeding stations. The hydroxycoumarin compound when pure is odorless and tasteless and does not reduce bait acceptability or cause bait shyness.

The action of the baits if accidentally taken by man, domestic animals, etc., may be readily combated by administration of vitamin K. There is no retention of the anticoagulant in the body and no permanent damage is done. The compositions, therefore, have a safety factor which is unique in this respect. For example, the compositions, as noted above, are multiple dosage baits and must be taken over a period of several days to accomplish kills. Single or spaced single dosages, even in relatively large amounts are substantially non-toxic. This in itself constitutes a great safety factor. In addition, at the dosages employed, i. e., the extremely small percentage of hydroxycoumarin compound present in the composition, the baits have proven relatively non-toxic to other animals and man. Also, the multiple dosage grain baits are not attractive to humans or to domestic animals such as the dog and cat, and in this respect differ materially from baits containing perishable foods such as meat, fish or cheese, or ground grains. The compositions of the present invention thus combine effective killing power in the rodent with relative safety to the handlers and those accidentally exposed to its action.

I claim:

1. A multiple dosage type rodenticide composition comprising cereal grain coated and impregnated with 3-(α-acetonylbenzyl)-4-hydroxycoumarin, said grain being provided with a coating of mineral oil covering said 3-(α-acetonylbenzyl)-4-hydroxycoumarin coated and impregnated grain, and an external coating of corn syrup solids covering said mineral oil coating, said composition containing at least 0.025% 3-(α-acetonylbenzyl)-4-hydroxycoumarin by weight on the dry substance basis.

2. A multiple dosage type rodenticide composition comprising coarsely cracked viable, mature, yellow corn coated and impregnated with 3-(α-acetonylbenzyl)-4-hydroxycoumarin, said coated and impregnated corn having an intermediate coating of mineral oil covering said 3-(α-acetonylbenzyl)-4-hydroxycoumarin coated and impregnated corn and an external coating of corn syrup solids covering said mineral oil coating, and said composition containing at least 0.025% 3-(α-acetonylbenzyl)-4-hydroxycoumarin by weight on the dry substance basis.

3. The process of preparing the composition of claim 1 which comprises spraying the cereal grain with an ethanol solution of 3-(α-acetonylbenzyl)-4-hydroxycoumarin, drying the sprayed grain, spraying the dried grain with mineral oil, then spraying the resulting oil coated grain with a corn syrup solution, and then drying the grain.

4. The process of preparing the composition of claim 1 which comprises spraying the cereal grain with an aqueous solution of a water soluble salt of 3-(α-acetonylbenzyl)-4-hydroxycoumarin, drying the grain, spraying the dried grain with mineral oil, then spraying the resulting oil coated grain with a corn syrup solution, and then drying the grain.

5. The process of preparing the composition of claim 2 which comprises spraying the cracked corn having a moisture content below about 10% with a 3-(α-acetonylbenzyl)-4-hydroxycoumarin solution, drying the corn, spraying the dried corn with mineral oil, then spraying the resulting oil coated corn with an aqueous corn syrup solution, and finally drying the corn in a warm blast of air.

References Cited in the file of this patent

UNITED STATES PATENTS

| Number | Name | Date |
|---|---|---|
| 2,146,867 | Welin | Feb. 14, 1939 |
| 2,523,252 | Smith | Sept. 19, 1950 |

FOREIGN PATENTS

| Number | Country | Date |
|---|---|---|
| 440,921 | Great Britain | Jan. 8, 1936 |
| 516,703 | Great Britain | Jan. 9, 1940 |
| 17,154 of 1928 | Australia | Nov. 25, 1929 |

OTHER REFERENCES

Pests, May 1949, pages 24, 26 and 28.
Soap and Sanitary Chemicals, Feb. 1950, pp. 131, 132, 135 and 147.
Reader's Digest, Mar. 1951, article entitled "Sure Death to Rats," by Paul de Kruif.